Sept. 22, 1931.  H. F. RICHARDSON  1,824,571
INSERT FOR UNDERFLOOR WIRING DUCTS OR THE LIKE
Filed May 6, 1927  2 Sheets-Sheet 1

WITNESS

INVENTOR.
HENRY F. RICHARDSON
BY
ATTORNEYS.

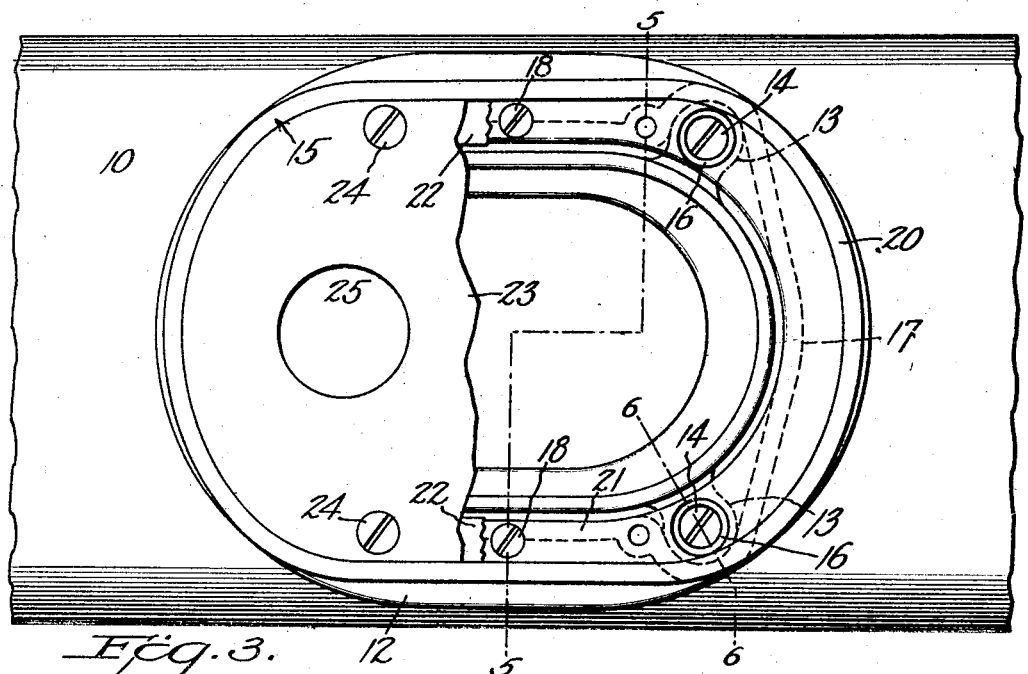
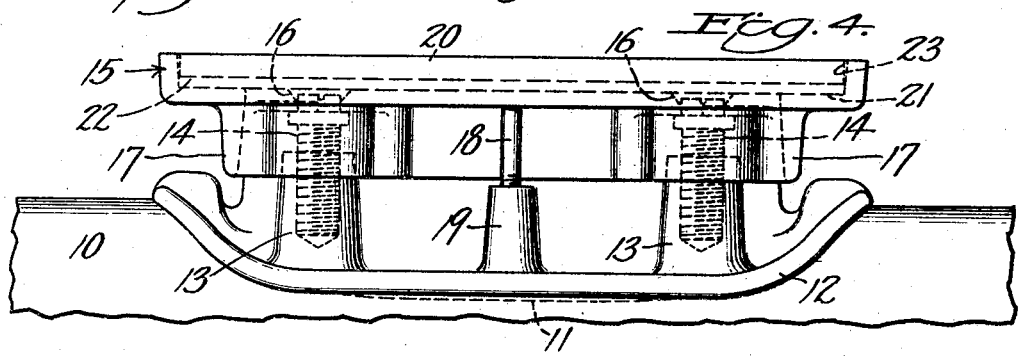
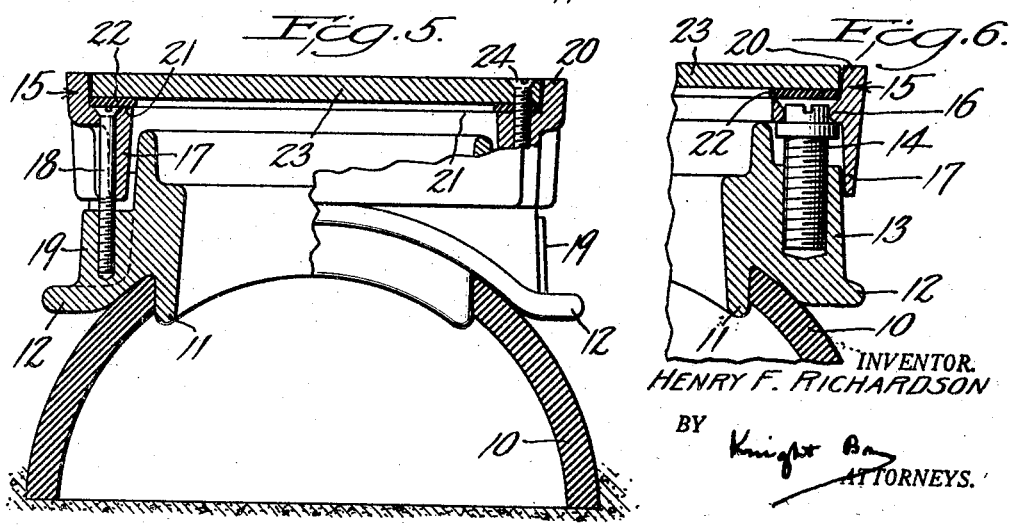

Patented Sept. 22, 1931

1,824,571

UNITED STATES PATENT OFFICE

HENRY F. RICHARDSON, OF NORTHPORT, NEW YORK, ASSIGNOR OF ONE-FOURTH TO HENRY F. RICHARDSON, OF NORTHPORT, NEW YORK, ONE-FOURTH TO ALLAN COGGESHALL, OF PLEASANTVILLE, NEW YORK, ONE-SIXTH TO S. R. BRADLEY, OF NYACK, NEW YORK, ONE-SIXTH TO A. M. CREGIER, OF ORANGEBURG, NEW YORK, AND ONE-SIXTH TO ALONZO B. BRADLEY, OF NEW YORK, N. Y.

INSERT FOR UNDERFLOOR WIRING DUCTS OR THE LIKE

Application filed May 6, 1927. Serial No. 189,291.

This invention relates to insert fixtures for use in connection with wiring conduit which is embedded beneath the surface of building floors and walls. A typical example of such systems is shown in the prior U. S. patent of Richardson and Coggeshall No. 1,530,200.

In such systems, the duct is generally covered over with a substantial layer of floor material such as concrete or cement and when electrical connections are to be made with the wiring in the duct, the floor surface is excavated to expose the top of the duct which is then cut through to receive a fitting, usually in the form of an adjustable bushing of cast metal which is set in place on the conduit, with its top surface in registry with the floor surface, and afterward sealed by filling in the surrounding space with cement or other floor material to restore the continuity of floor surface in a neat and workmanlike manner. Such insert fittings have a readily removable cover plate which is removed at the time of introducing the wiring so as to give access to the cables within the conduit. The process of installing the wiring and cable frequently involves the fishing or drawing of a comparatively heavy stiff cable which has to be passed through the insert fitting on a rather sharp curve or bend.

A primary object of the present invention is to provide a form of insert fitting which will greatly facilitate the introduction of wiring cable through it and which will be adapted to conform with the dimensions and shape of the conduit upon which it is to be seated. It may be stated in a preliminary way that these purposes are in general fulfilled by the adoption of an elongated or oval shape of insert, the major axis of the opening lying in the direction of the conduit run. A further feature resides in the provision of a bushing or neck which fits into a correspondingly formed opening in the top of the conduit and has a surrounding flange or rim which follows more or less closely the shape of the conduit. The penetration of the bushing into the conduit effectively centers the fitting whereas the surrounding flange provides a construction which utilizes a relatively large area of supporting surface on the conduit.

An embodiment of the fitting as applied to a half round duct is shown by way of example in the accompanying drawings, in which Figure 1 is a central longitudinal section through a section of conduit, with the insert fitting in place thereon, showing the position of the cable at the time of introducing or withdrawing the same.

Figure 3 is a top plan view of the conduit and insert fitting, with the cover of the latter broken away.

Figure 4 is a side elevation of the insert fitting in place on the conduit.

Figure 5 is a transverse vertical section through the duct and insert fitting on the line 5—5 of Figure 3, with parts of the fitting in full view.

Figure 6 is a detail vertical section on the line 6—6 of Figure 3.

Figure 1:
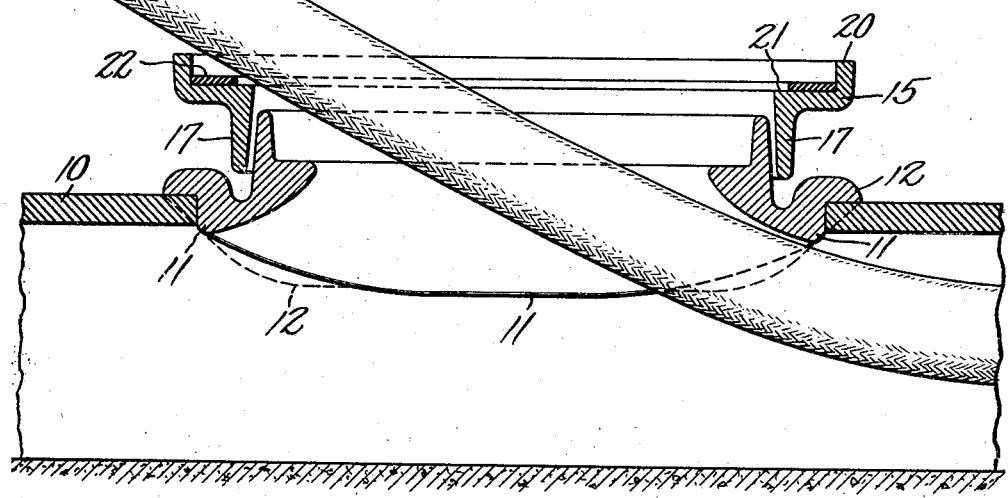

Referring in detail to said drawings, a section of conduit is illustrated at 10, this conduit being for example of fibre or other suitable construction and being illustrated in the present instance as of half-round, open bottom construction. It will be understood that an insert fitting constructed in accordance with my present invention may be applied to the top of the conduit either before or after the floor material is filled in above it and that in the latter case the floor surface would be cut through to expose the top of the conduit in order to apply the insert fitting. In either case, however, the top of the conduit 10 will be cut out on an oval line, which may be conveniently done by making two circular cuts as indicated by the dot and dash lines, shown in Figure 2, and thereafter removing the material intervening between the two circles to a line tangential with them at each side of the opening. Such a perforation is made to the dimensions of the neck or bushing above referred to, such neck or bushing portion of the fitting being indicated at 11 and clearly seen in Figures 1, 5 and 6. This neck portion 11 is of a generally oval contour, in plan view, with flat sides tangential to the circular ends, and in order that it may conform with the contour of the conduit 10, it is curved upwardly at the ends, as clearly seen in Figures 1, 4 and 5. The end walls of its apertures are convexly curved in the vertical plane of its major axis. The surrounding flange 12 follows more or less closely the contour of the neck 11 but is laterally flattened out along the sides, as shown in Figures 2 and 5, to enable the concrete or cement to give support to the fitting. The neck 11 and flange 12 may be cast integral with each other and together they constitute what may be termed the bed portion of the fitting. This bed portion furthermore is formed with bosses 13 which are bored and tapped to receive the shouldered levelling screws 14 upon which the floor plate frame 15 is seated (see Figures 4, 5 and 6). The shouldered levelling screws 14 may, for example, be four in number and the frame 15, as clearly shown in Figure 6, is provided at the corresponding points with perforated sockets 16 which fit over the levelling screw heads so that the latter are accessible through the perforations, for adjustment of the levelling screws by means of a screw driver or in some other suitable manner. The floor plate frame 15 has a stiffening flange 17 extending around the inner periphery on the lower surface and is furthermore provided in the present example with perforations through which retaining screws 18 are inserted, the latter being threaded in the tapped lugs 19 of the bed portion of the fitting, so that the frame 15 may be drawn tightly down upon the shouldered levelling screws 14 and securely held in good alignment with the floor surface to which it has been adjusted. The upper portion of the frame 15 has a peripheral flange 20 and within this a flat shoulder 21, to receive a washer 22 and the floor plate 23. The floor plate 23 may be drawn down tightly upon the washer 22 by means of the screws 24 which pass through the floor plate and washer and into tapped portions of the frame 15. Floor plate 23 may be provided with one or more perforations 25, through which the cable or the wiring connection extends in the finished installation.

Figure 2:
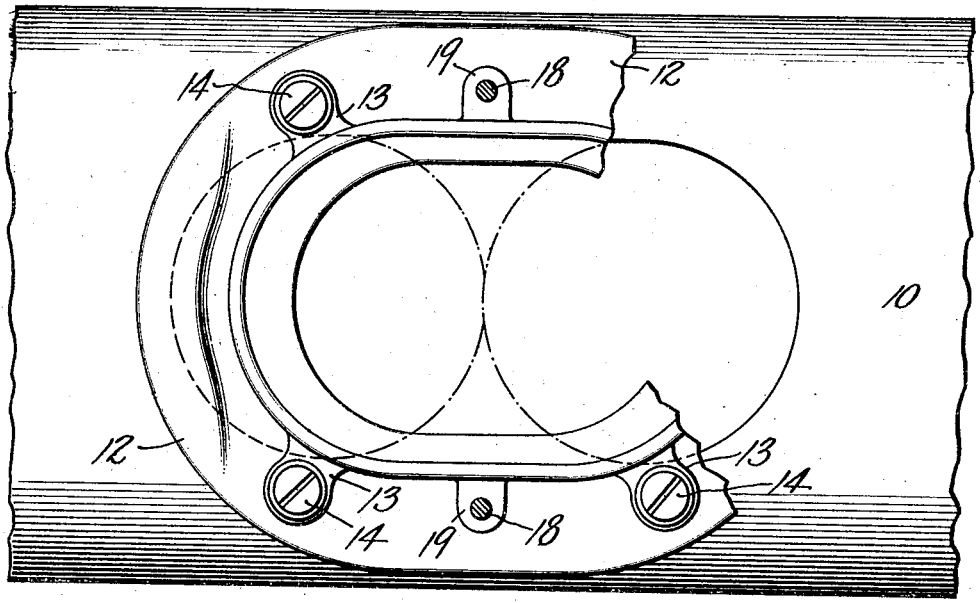
Figure 2 is a top plan view of the conduit and insert fitting, with a part of the latter broken away to show the perforated conduit.

Referring to Figure 1, which illustrates the drawings of a cable through the insert fitting, it will be observed that the inner surface of the neck 11 at each end is rounded off on a gradual curve conforming more or less with the natural line of curvature of the cable. The floor plate 23, as will be understood, is removed at the time the cable is being inserted or withdrawn. The oval form of the opening, with its major axis extending in the direction of the conduit run, provides much greater accessibility to the work and obviously the drawing or fishing of the cable is accomplished with much greater facility than in the case of the previous circular inserts in which the diameter of the opening is necessarily less than the diameter of the conduit. Whereas the width of the opening in the present form of insert fitting is necessarily limited by the width of the conduit, the length of the opening may practically be made to meet the convenience of operation so that even in conduit of very small cross section the introduction and removal of cable through the insert fitting is much more easily accomplished than with the older type of fitting.

Many of the features of the present invention are, of course, applicable to the construction of insert fittings to be used with duct or conduit of other shapes than herein illustrated, it being understood that in any case the principle of centering and supporting the insert fitting contemplates the design of the centering and supporting bed portion to suit the shape of the duct.

I claim:—

In combination, a perforated conduit wall, and an insert fitting comprising a centering portion adapted to enter in the conduit wall, and having a surrounding flange adapted to seat on the conduit wall and extending laterally therefrom.

HENRY F. RICHARDSON.